July 9, 1957

G. F. RICHARDS 2,798,605

ELECTRONIC INSPECTION APPARATUS

Filed July 12, 1950

INVENTOR
GEORGE F. RICHARDS
BY
Thomas M. Ferrill, Jr.
ATTORNEY

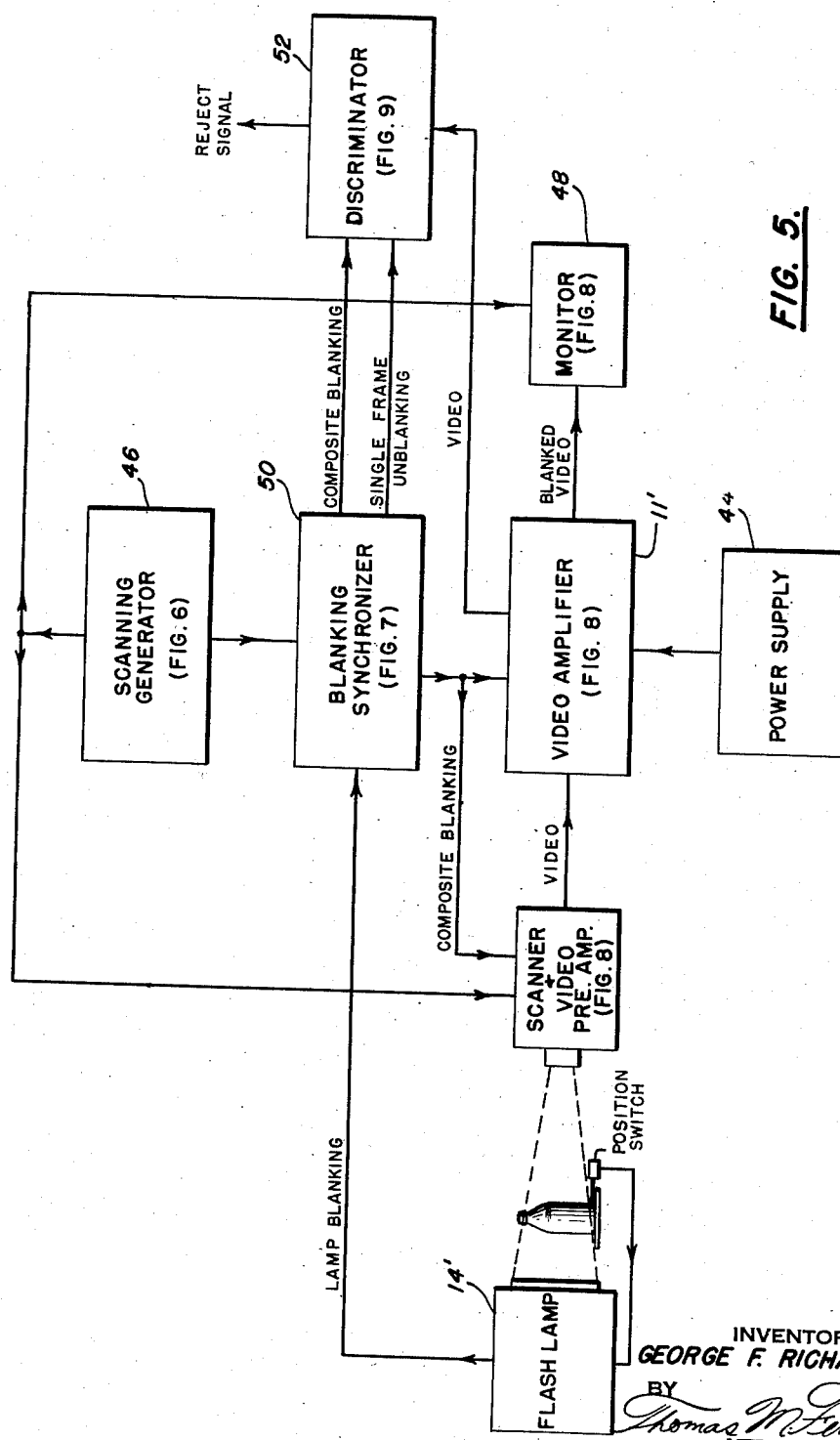

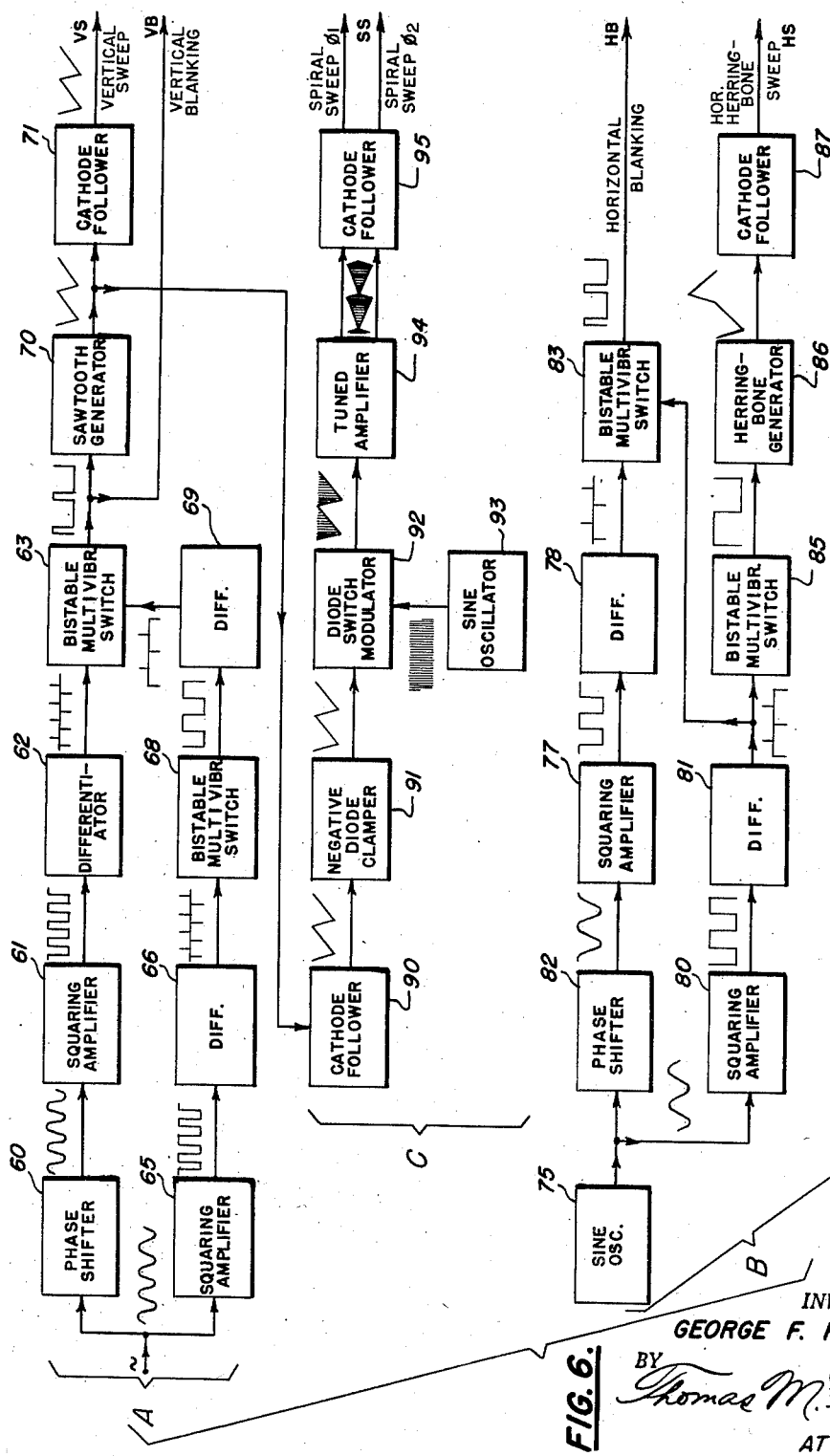

INVENTOR.
GEORGE F. RICHARDS

INVENTOR.
GEORGE F. RICHARDS
ATTORNEY

INVENTOR.
GEORGE F. RICHARDS
BY
Thomas M. Ferrill, Jr.
ATTORNEY

July 9, 1957

G. F. RICHARDS 2,798,605

ELECTRONIC INSPECTION APPARATUS

Filed July 12, 1950

INVENTOR.
GEORGE F. RICHARDS
BY
Thomas W. Ferrill, Jr.
ATTORNEY

United States Patent Office 2,798,605
Patented July 9, 1957

2,798,605

ELECTRONIC INSPECTION APPARATUS

George F. Richards, Garden City, N. Y., assignor to Tele-Tect Corporation, Westbury, N. Y., a corporation of New York Application July 12, 1950, Serial No. 173,288

24 Claims. (Cl. 209—111)

The present invention relates to automatic inspection apparatus and devices, and is particularly concerned with photo-electric inspection apparatus suitable for detecting foreign matter in bottles.

Bottle inspector units have heretofore been devised for comparing the total light reflected from each bottle in a conveyor line with the normal total light reflection from an average clean bottle, as by taking a measure of an electric signal produced by a photo-electric cell arranged with suitable optical means to illuminate the bottle or other object and to gather a predetermined percentage of the light coming from the bottle or other object.

Systems of this type suffer a severe limitation on capacity to detect small objects, or spots, on the inner surface of the bottle. The basis for this limitation is apparent from contemplation of the relative areas involved. If a spot or object of a size such as a square one-eighth inch on a side is located on the inner surface of a bottle having a projected glass area of twenty square inches under inspection by the total-reflected-light apparatus, then the change of intensity of the total light is extremely insignificant by comparison to that from a clean bottle of equal size and equal character and clarity of the glass, even with maximum contrast of the color or the darkness of the spot or foreign object. If all of the glass except the foreign object reflects strongly into the lens and photo-electric cell and the foreign object reflects no light, the diminution of total light is in the ratio of one-sixty-fourth divided by twenty, or less than one-thousandth. Since clean bottles of a given style vary dimensionally and in their light reflecting properties, it is out of the question to try to perfect a total-light inspection system to the extent to detect such small objects or dirty spots.

Another arrangement which has been proposed for inspection of objects such as bottles involves setting up an extensive matrix of photo-electric cells with optical arrangements for bringing to each photo-electric cell that light coming from a small elemental area of the object under inspection. Some improvement is gained in this way over the use of a single cell responsive to the reflected light from the entire area of the object, and consequently, it is capable of higher sensitivity to small foreign objects or spots. But these multi-cell matrix instruments are quite complex, and the detection response circuits for making use of changes of individual cell voltage are necessarily quite complex.

It is an important objective of the present invention to provide automatic inspection apparatus capable of very high sensitivity and of detection of very small objects or spots or other faults.

A further objective is to provide automatic inspection apparatus suited for actuation of a simple output circuit in which may be connected an automatic ejector for eliminating objects (e. g. bottles) from a conveyor.

A further objective is to provide automatic inspection apparatus capable of adequate and thorough inspections of objects such as bottles in motion along a rapid conveyor system.

Furthermore, it is an objective of this invention to provide automatic inspection of each of a series of bottles from a plurality of different points of view, so that spots or foreign particles which normally would escape detection by viewing apparatus in one direction therefrom will be detected by one or more inspection units operating from other viewpoints.

Other objectives of this invention include the production of sweep control circuits and beam blanking circuits for operation of television camera tubes as units or elements of an automatic inspection system for the most efficient detection of foreign objects or particles in bottles.

Yet another objective of the present invention is to provide automatic selective ejection of objects such as bottles as they proceed through the inspection apparatus.

In accordance with the present invention, objects such as bottles passing along a conveyor line or other predetermined path are caused to pass before the optical system of electronic apparatus closely related to a television camera. As each object in turn reaches a predetermined position, a brilliant light flash of very short duration is provided, illuminating the object and causing electrons to be distributed over the mosaic of the television camera tube according to the image of the object as "seen" by the camera apparatus at the instant of the light flash. The mosaic is scanned thereafter by the cathode ray gun of the camera tube, producing video signals which are amplified and supplied to responder apparatus arranged to detect an appreciable discontinuity of the video signal from its average level, respresenting the effect of a foreign particle or a spot or other fault in or on the object, and to cause the automatic ejection of the faulty object.

As applied especially to automatic bottle inspection, at least one such camera unit is set up to "view" the bottles, each in its turn, as they travel through the production system. Preferably, the inspection process is carried out on the bottles shortly before they reach the point at which they are to be filled. An important feature of the present invention for use in bottling plants is the provision of multiple photo-electronic viewers for making a plurality of inspections of each bottle from selected advantageous viewpoints, so that a particle so situated as to escape detection by one camera unit is detected by another. Preferably, in the inspection of bottles, two transverse "views" are taken of each bottle, and in addition, a "view" is taken looking downward through the neck of the bottle, whereby the most critical inspection of the bottom of the bottle is afforded. The plural views, which may be the three views described above, may be effected successively, with a light flasher for each camera unit, or two or more "observations" of the bottle from plural points of view may be made simultaneously.

In the drawings, Figs. 1, 2, 3 and 4 illustrate suitable general arrangements of the television camera units and flash lighting units and control systems relative to the conveyor system;

Fig. 5 is a general system block diagram;

Fig. 6 is a schematic diagram of the scanning voltage generators;

Figures 1, 2:
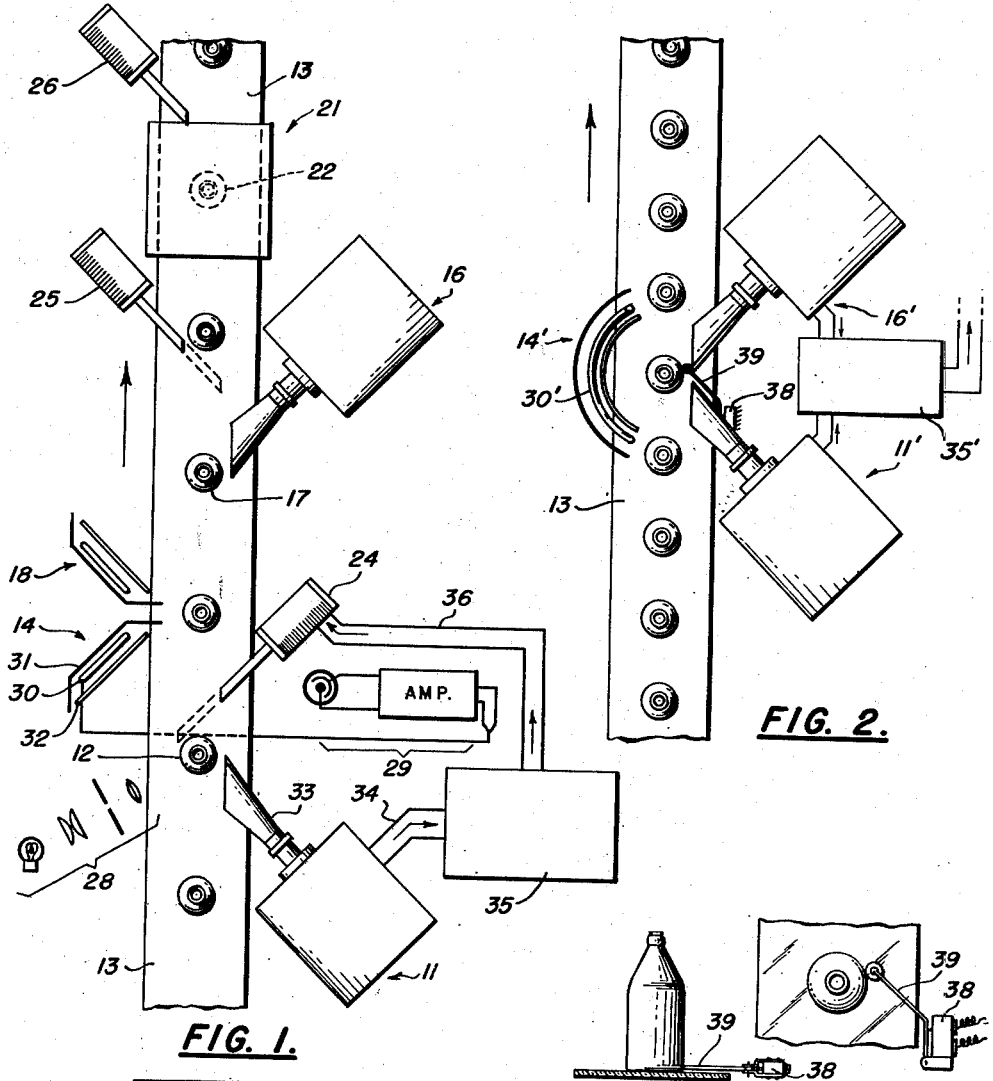

Fig. 1 illustrates a series of three television-type camera units set up along a bottle conveyor line. A first camera unit 11 is arranged to "view" the bottles as they pass through the position of bottle 12 on the conveyor belt 13. A flash illuminator unit 14 is arranged to provide high-intensity diffused lighting of the bottle from the direction generally opposite to the position of camera unit 11. A second camera unit 16 is provided for "viewing" each bottle substantially horizontally as it passes through the position shown occupied by bottle 17. A flash illuminator unit 18 is arranged for illuminating the bottles for camera unit 16. The direction of camera unit 16 is transverse that of camera unit 11—it may be perpendicular thereto, but it is not restricted to exact perpendicularity.

A third camera unit 21 is arranged to "look" downward through the neck of each bottle, to receive a flash "view" as each bottle passes through the position occupied by bottle 22. Preferably, a flash illuminator similar to units 14 and 18 is provided beneath belt 13 and aimed upward for illumination through the bottom of each bottle, and the belt 13 is formed of translucent material to permit the transmission of light for this purpose.

Automatic ejection apparatus is provided for removing from the conveyor belt 13 any bottle found to be faulty or improperly cleaned. This may comprise a solenoid unit 24 arranged to eject bottles according to the output signals from camera unit 11, and ejector units 25 and 26 similarly arranged for operation in response to the signals produced by the output circuits of camera units 16 and 21, respectively. If desired, fewer ejectors may be used along with suitable timers of the travel of the conveyor belt.

Means are provided responsive to the arrival of bottles at the predetermined position for triggering each flash illuminator and for causing the associated camera unit to receive a "view" of the bottle at that position. The means for this purpose may comprise a sensitive mechanical switch arranged to engage each bottle as it passes, or it may comprise a transverse light beam and photocell receiver unit, an arrangement of the latter being shown schematically at 28 and 29 in Fig. 1, in connection with flash illuminator unit 14.

The flashes of illuminator unit 18 and the bottom illuminator may be timed either by photoelectric or mechanical switches at the respective "viewing" positions, or may be timed by siwtching system 28, 29 with allowance made for travel time of the conveyor belt 13.

The flash illuminator unit 14 comprises a high-intensity gas discharge tube 30 such as a mercury-vapor lamp having a starting control electrode, a suitable shape for the lamp being an elongated tube of small diameter which is folded by means of rounded bends into a grid-like structure, with a mercury pool in a downwardly projecting end thereof. High-intensity flash lamps of this general type are described in U. S. Patent No. 2,152,639 to H. E. Edgerton, and suitable power supply and triggering circuits for the repetitive flashes are shown in Edgerton Patent No. 2,186,013, issued January 9, 1940. A reflector 31 is provided behind the high-intensity flash lamp, arranged to concentrate the illumination thereof toward the bottle to be "inspected," and also to shield the lighting, confining it to the bottle and camera unit. A diffuser unit 32 is provided in front of the flash lamp, to provide a substantially uniform-field light source from the rear of the bottle 12 under inspection.

The camera unit 11 is provided with a light shield unit extending forward from its objective lens system, for the purpose of confining the reception of substantial light in the camera to that light which is projected from the illuminator 14 through the bottle at position 12.

The receiver section 29 of the photo-electric timer unit is coupled to the flash lamp 14, for triggering it with accurate timing upon the interruption of the beam from source 28 as the bottle arrives at the precise position indicated in Fig. 1.

The camera unit 11 is shown connected by a cable 34 to an additional chassis unit 35, from which an output cable 36 is provided connected to the solenoid rejector unit 24.

The vertical sweep action for the camera unit 11 is a typical saw-tooth type slow speed vertical sweep; but the horizontal sweep, in contrast to the high-speed or high-frequency saw-tooth sweep employed in television, camera units, is a high-speed "herring-bone" sweep action, arranged for sweeping from one side of the mosaic toward a substantially central vertical line, with an almost immediate jump thereafter to the opposite side of the mosaic and a sweep therefrom to the centerline of the mosaic at substantially equal speed but in the opposite direction to the original line of scan from the first edge of the mosaic.

The reason for using the "herringbone" sweep action is so that upon each sweep, the beam impingement spot on the mosaic will be made to travel first through a marked discontinuity corresponding to the border of the bottle image, and any following discontinuity will be a definite indication of a fault. Means are provided for preventing the first discontinuity encountered in each inward sweep from operating the fault indicating apparatus such as the ejector.

If ordinary linear sweep entirely across the picture area of the mosaic were relied upon, there would exist a special problem of distinguishing not only the bottle image entry video excursion but also the bottle image exit video excursion from excursions due to faults, the image exit excursion occurring at variable delays after the entry excursion, and hence not being subject to mere fixed-delay rejection.

It will be readily apparent that a completely separate unit like unit 35 may be provided for operation in connection with unit 16, and a third unit also like unit 35 may be provided for operation in connection with camera unit 21. However, for many installations it is desirable to make dual or treble use of some of the sweep control circuits, and arrangements for doing this will be described hereafter.

It will also be apparent that two or more camera units may be arranged to provide simultaneous response to a single flash of light through the bottle in a selected position, generally as indicated in the example of Fig. 2. In this illustration, the illuminator unit 14' is curved into a shape corresponding approximately to a cylindrical section, and horizontal camera units 11' and 16' are arranged substantially at right angles to each other, in such a way that both of these camera units respond to a single flash of light through the bottle when it is at the position defined by the point of intersection of the axes of the focusing lenses of the horizontal camera units.

Figures 2A, 2B:
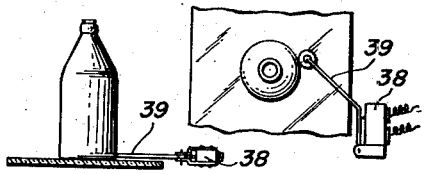

Fig. 2 indicates a micro-switch provided with an actuator as the means for timing the flashes of the illuminator 14'. The physical positioning of the micro-switch with respect to the bottle is shown more clearly in Figs. 2A and 2B, with the bottle just arriving at the point at which the switch contact is made. The micro-switch is indicated at 38, and its actuator arm is indicated at 39.

Unit 35' is a system including the horizontal and vertical scan control circuits for camera units 11' and 16', and also including the selective control circuits responsive to these camera units for signalling the operation of an ejector upon the occurrence of an appreciable discontinuity in the video output of either of camera units 11' and 16', resulting from foreign matter in the bottle.

Figures 3, 4:
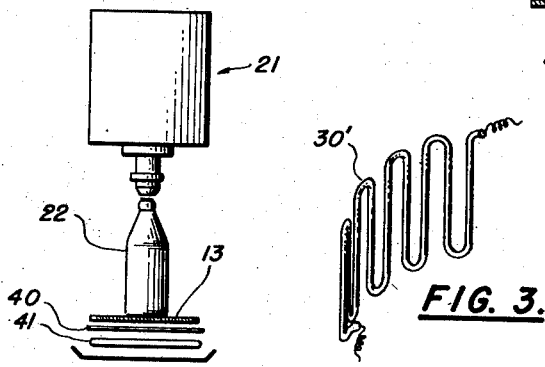

Fig. 3 illustrates the manner in which the illuminator tube 30' of Fig. 2 may be formed into a grid-like arrangement conforming generally to a substantially cylindrical segment.

The flash lamp units of each of the three illuminators indicated generally in Fig. 1 correspond substantially to to the unit as seen in Fig. 3, with the straight and parallel sections of the tubing being substantially coplanar.

Fig. 4 illustrates the arrangement of the vertical view camera unit 21 above the bottle 22, and in this figure the translucent belt 13 is seen in cross section with the diffuser 40 and grid-like flash lamp 41 apparent therebelow.

Fig. 5 illustrates the major circuit divisions comprehended in unit 35 of Fig. 1 and 35' of Fig. 2. A low-voltage power supply 44 supplies power to the video amplifiers and the sweep circuits, scanning generators, synchronizer stages, and the discriminator and rejector control apparatus.

The scanning generator subassembly 46 provides a common vertical sweep circuit and a common horizontal sweep circuit for the respective scanning elements of the two horizontal camera units, and for the corresponding scanning elements of the cathode ray presentation tubes provided in the monitor unit 48 for observation of the camera system performance.

A blanking synchronizer unit 50 is provided for withholding the horizontal and vertical sweep voltages from the camera tube until the commencement of a complete sweep field following the flash of the illuminator 14', and for permitting a predetermined series of sweeps of the camera tube thereafter for deriving during the first complete field sweep the video signal data on which the operation of the system depends, and for completing the erasure of the stored signal-image charges in the repeated scans continuing thereafter. This synchronizer 50 also is operatively connected to the discriminator subassembly 52, for restricting it to operation in reliance upon a single frame scan and the video signals provided therein, and preventing it from responding to signal variations occurring during the succeeding erasure scans.

Fig. 6 is a schematic diagram illustrating how the scanning sweep voltages are generated for the scanning elements of the camera units and the monitor system. The vertical sweep voltage for thirty vertical sweeps per second in the horizontal camera units and thirty radial sweeps per second in the vertical camera unit is produced by the circuits illustrated in block diagrams in Fig. 6A. A phase shifter 60 is arranged to receive input voltage from the 60-cycle power main and to provide an output version thereof shifted in phase by an angle which may be of the order of 72 degrees. This is supplied to the input circuit of a wave squaring amplifier unit 61, the output of which is differentiated by an R-C circuit 62 to supply alternate positive and negative "spikes" to one input circuit of a bi-stable multivibrator switch 63.

A squaring amplifier 65 is arranged to receive input voltage from the 60-cycle supply main and to provide a 60-cycle square wave output version to a differentiator 66. The output of this stage controls the input circuit of a bi-stable multi-vibrator 68 employed as a frequency divider, to provide square wave output at one-half the frequency of the preceding stages, i. e., at 30 cycles per second. This 30-cycle square wave is differentiated in circuit 69, and employed to control the other input circuit of bistable multi-vibrator switch 63.

This switch circuit 63 responds only to negative pulses received from unit 62, following negative pulses received from circuit 69. Its output is a narrow rectangular wave (of the order of 36 degrees wide at 30 cycles per second), each positive pulse thereof being initiated by a negative pulse from circuit 69 and cut off by the immediately succeeding negative pulse from circuit 62.

The recurrent pulse signal output thus produced by circuit 63 is supplied to a saw-tooth wave generator circuit 70, which produces a 30-cycle saw-tooth output wave having its high-speed excursions (fly-back sweeps) coincident with the brief positive pulses from circuit 63, and having its principal sweep portions timed in coincidence with the intervals between successive pulses. The duration of the pulses from circuit 63 may be adjusted by adjustment of the phase shifter 60, as desired.

A cathode follower amplifier stage 71 is provided for receiving the output of the saw-tooth wave generator 70 and supplying versions thereof to the vertical deflection plate circuits of the camera tubes in units 11 and 16, or units 11' and 16'. The output waves from the stage 71 are also used to provide synchronized vertical sweep in the corresponding cathode ray tubes of the monitor unit 35.

The horizontal sweep waves for the two horizontal camera units and the associated cathode ray tubes in the monitor are produced by the circuits indicated in Fig. 6B. A sine wave oscillator 75 is employed for supplying corresponding waves at 15,360 cycles per second to the input circuits of two amplifying, squaring, and differentiating circuit chains 77, 78 and 80, 81, with a phase shifter 82 connected in the first chain. A bistable multivibrator switch 83 is connected to be triggered on by the negative spikes in the output wave from circuit 81 and to be triggered off by the negative spikes in the output wave from circuit 78. The output wave of this multivibrator switch, characterized by recurrent pulses or narrow rectangular waves, is supplied to the blanking synchronizer circuit to be described.

The output of unit 81 also is supplied to the input circuit of a bistable multivibrator 85 arranged to operate as a frequency divider supplying a square wave output at 7,680 cycles per second. This wave is supplied to the input circuit of a special "herringbone" wave generator 86 to be described. The output circuit of this generator 86 is coupled to a cathode follower amplifier 87 which supplies the sweep voltage to the horizontal deflection plates of the camera tubes in the horizontal camera units, and to the horizontal deflection plates of the associated cathode ray tubes in the monitor.

The sweep waves for the vertical camera unit are modulated sine waves of quadrature phase relations, their modulation envelopes being waves corresponding to a saw-tooth wave. The circuits for this purpose are indicated at C in Fig. 6. A cathode follower stage 90 is coupled to the output circuit of stage 70, to provide a substantial reproduction of the output waves thereof. The output of stage 90 is fed to a negative diode clamper stage 91 for inserting a direct voltage component so that the voltage variations progress unidirectionally from the zero-voltage axis. A diode switch type modulator 92 is arranged to have its signal input circuit supplied by the output of a sine-wave oscillator 93, illustrated as arranged for operation at 3.84 kilocycles per second. The amplitude control input circuit of modulator 92 is coupled to the output circuit of clamper 91, so that the 3.84 kilocycle output of the modulator is characterized by an envelope form corresponding to the saw-tooth waves and the zero-voltage axis of the output of stage 91.

The modulated output waves produced by stage 92 are supplied to a 3.84-kilocycle tuned circuit 94, and a dual cathode follower stage 95 is provided with selective phase input circuits coupled to the tuned circuit 94 for providing two output components substantially identical in form with the waves produced in the tuned circuit 94 but in fixed 90-degree phase relations. The tuned circuit 94 has the dual purposes of providing 90 degree phase relation and filtering out the distortion of the 3.84 kilocycle waves due to limiting action of the modulator diodes.

Figure 7:
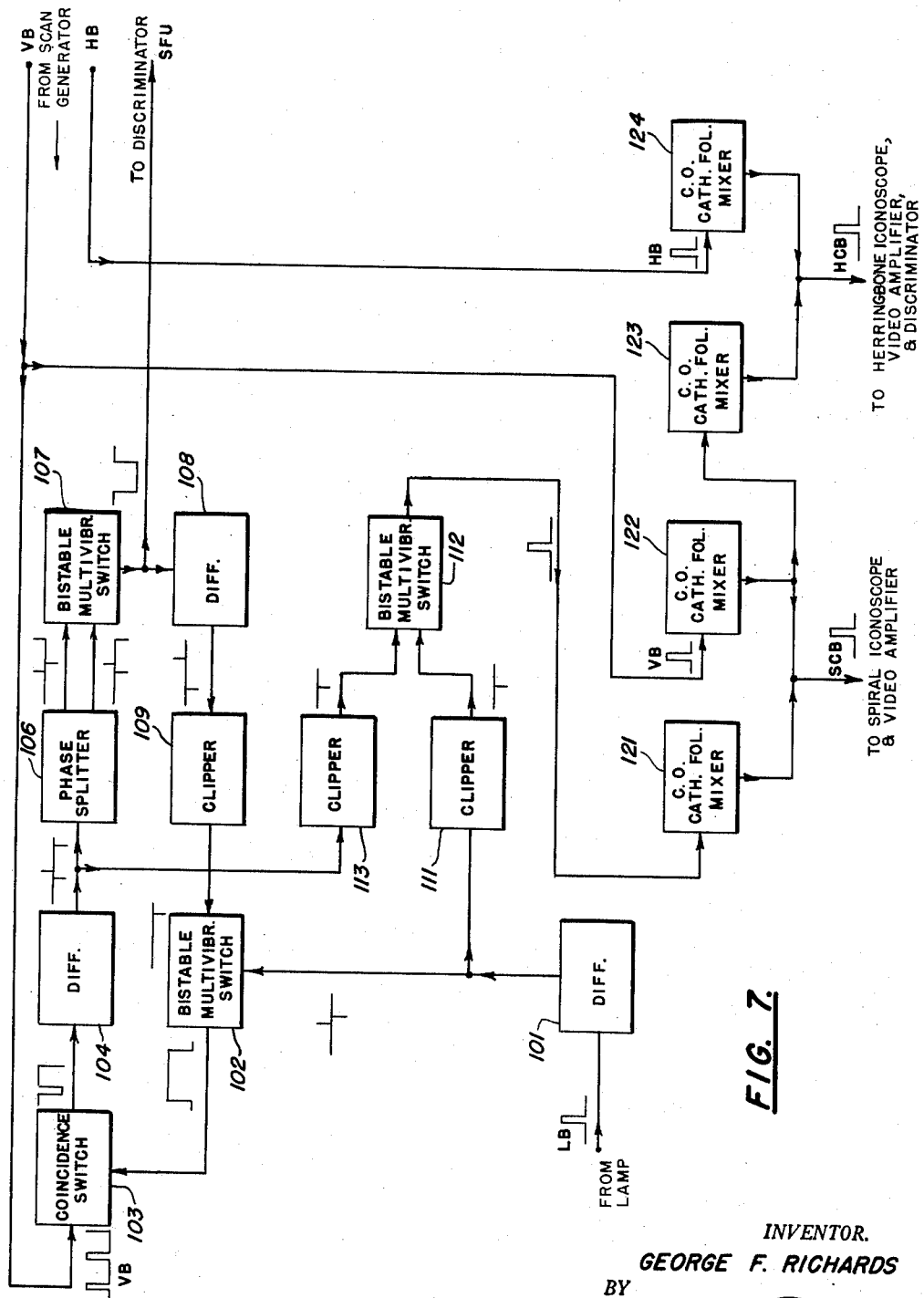
Fig. 7 is a schematic diagram of the blanking synchronizer section of the system.

The principal circuit features of the blanking synchronizer 50 of Fig. 5 are set forth in the block diagram of Fig. 7. This apparatus sub-combination 50 receives the vertical blanking wave VB of 30 pulses per second from the output of stage 63 of Fig. 6A, the horizontal blanking wave HB of 15,360 pulses per second from stage 83 of Fig. 6B, and a wave of substantially recurrent pulses corresponding to the flash lamp ignition pulses. It provides a "single-frame unblanking" pulse SFU with a duration slightly shorter than one-thirtieth second, corresponding to the time for one vertical sweep of the horizontal camera units and one spiral area scan of the vertical camera unit, commencing simultaneously with the commencement of the first of such scans immediately after the extinguishment of the flash lamp, and ending simultaneously with the ending of such first scan. This wave SFU is supplied to the horizontal and vertical camera discriminator circuits, to render them unresponsive to any variations of video output or extraneous voltage excursions occurring during the flash of the lamps, or immediately thereafter until the commencement of a complete scan frame, or after the first scan frame until the next flash timed for the succeeding bottle arrival at the critical position.

This sub-combination of elements 50 further provides two composite blanking waves in the respective ones of two separate output circuits, the first for connection to the iconoscope and the video amplifier of the vertical camera unit, and the second for connection to the iconoscope and the video amplifier of the horizontal camera units.

The wave of widely separated pulses LB corresponding to the flashes of the illuminator are differentiated by unit 101 to produce positive and negative pulses. A bistable multivibrator 102 responds to the negative pulse output of unit 101, with the commencement of a relatively long output pulse. A pentode coincidence switch circuit 103 receives this output of unit 102, and also receives the blanking pulse wave VB of 30 pulses per second. The first of these pulses VB or first portion thereof occurring during the long pulse produced by unit 102 is reproduced in the output circuit of unit 103, and is differentiated in a differentiator circuit unit 104.

The output wave of unit 104, consisting of positive and negative spikes, is supplied to a stage 106 having cathode and anode output circuits, for producing an upright version and an inverted version of the wave from unit 104. These versions are both supplied to a bistable multivibrator switch unit 107, so arranged as to produce output pulses triggered on by a spike of one version of the output of unit 106 corresponding to the end of a pulse of the vertical blanking wave VB passed through coincidence unit 103 and triggered off by the next succeeding spike, i. e. the differentiator output spike timed at the commencement of the next succeeding vertical blanking pulse, and hence at the end of the frame of the vertical sweep.

The output of unit 107 is differentiated in circuit 108, producing an output wave which is supplied to the input circuit of a negative clipper stage 109 comprising an amplifier biased to cut-off. The negative spike output wave of this stage is supplied to the second input circuit of bistable multivibrator unit 102 to trigger off the wave commenced as aforedescribed in response to the output of differentiator 101. This triggering-off action leaves unit 102 in the quiescent condition in which it must remain awaiting a further lamp flash pulse, so that only one negative "single-frame unblanking" pulse can be produced at the SFU output circuit in the interval between two flashes of the illuminator system.

The output of unit 101 is also supplied to a negative clipper amplifier unit 111 similar to unit 109, for triggering on a pulse wave at the output of a bistable multivibrator unit 112 at the timing of the commencement of each illuminator flash. A further negative clipper amplifier unit 113 receives a version of the output of unit 104, and supplies its output to the other input circuit of unit 112 to trigger off the output pulse thereof at the timing of the end of the first vertical blanking pulse or portion thereof passed by unit 103 after the completion of the flash.

Thus, bistable multivibrator switch unit 112 produces one output pulse commencing with the beginning of the flash of the illuminator with the arrival of each bottle, and the pulses are of irregular length, always terminating at the end of the next following vertical blanking pulse and the beginning of the complete sweep frame of the iconoscopes.

The composite blanking wave for the vertical camera unit for interrupting the iconoscope beam, cutting off the video signals to the monitor tube and disabling the spiral scan camera discriminator circuits, is provided by mixing the output of unit 112 with the 30 cycle pulse signal wave VB in a pair of interconnected cathode follower stages 121 and 122. The common cathode output circuit of these stages is supplied to the spiral scan iconoscope grid circuit and the video amplifier therefor.

A version of the spiral scan blanking signal thus produced through stages 121 and 122 is also supplied to the grid input circuit of a further cathode follower 123 having its cathode interconnected with the cathode of a fourth cathode follower 124 which receives the 15.36-kilocycle pulse wave HB from stage 83 of Fig. 6B. In the common output circuit of the two last-named cathode followers, the composite wave HCB for blanking of the grids and disabling of the video amplifiers of the horizontal camera units amounts to a bringing together of the line retrace blanking signals, the field retrace blanking signals, and the blanking signals corresponding to the successive periods each commencing with the ignition of the illuminator system and ending with the commencement of the next following complete frame scan.

This second composite blanking output wave is supplied to the discriminator circuit receiving the output of the horizontal camera units, i. e. the camera units with the herringbone wave scan, for providing horizontal line retrace blanking therein.

Figure 8:
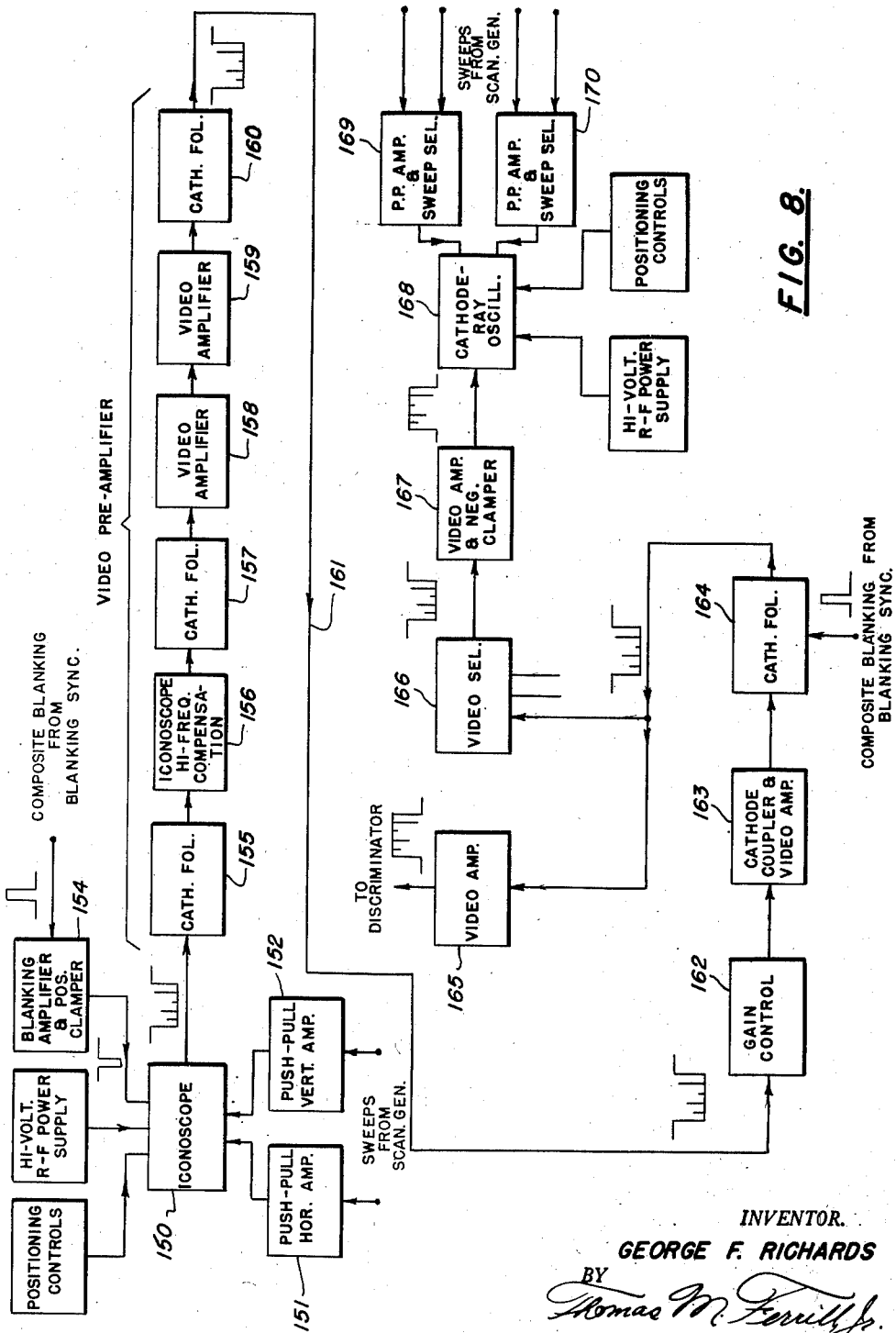
Fig. 8 is a diagram of the iconoscope and associated circuits of the system operating from one selected viewpoint.

The general arrangement of the electronic system parts in the camera units and the equipment units responsive thereto indicated in Fig. 8. An iconoscope 150 is provided for receiving a focused image of the object, e. g. the bottle in the conveyor system, as illuminated by a very brief flash of the aforedescribed high-intensity illuminator. An example of a suitable iconoscope for this purpose is the type 5527 tube, which includes internal electrostatic deflection plates for horizontal and vertical deflection. Horizontal and vertical sweep amplifiers 151 and 152 are connected thereto, and are arranged to receive the outputs of units 87 and 71, respectively, if the camera unit is to be used with the herringbone sweep action for horizontally viewing the object, or to receive the outputs of unit 95 if the camera unit is to be used with the spiral sweep action for vertically viewing the object.

The control grid circuit of the iconoscope 150 is controlled by the output of a blanking amplifier and positive clamper unit 154, which receives the HCB output of mixer 123, 124 (Fig. 7) if the camera unit is actuated by herringbone scan voltages, or the SCB output of mixer 121, 122 if the camera unit is actuated by sprial scan voltages.

The video output of the iconoscope 150 is amplified in stages 155, 156, 157, 158, 159 and 160, from which the highly amplified version may be transmitted over coaxial cable 161 for an appreciable distance, if desired, to the further video amplifier elements and stage 162, 163, and 164. The last-named stage preferably is a cathode follower stage, into which is supplied the appropriate composite blanking signal. The output of stage 164 is amplified in a further amplifier employed as an isolating amplifier, and the output version thereof is transmitted to the discriminator circuits to be described in more detail below.

The output of stage 164 is also supplied to one input connection of a video selector switch 166, the common circuit of which is coupled through a video amplifier and negative clamper stage 167 to the intensity control grid of a cathode-ray kinescope tube 168. The vertical and horizontal deflection plates of the kinescope 168 are supplied through amplifiers 169 and 170, respectively, which are provided with input selector switches for application of the saw-tooth and herringbone sweeps when the monitor is used for observation of the output of one of the horizontal camera units, or the modulated sinusoidal voltages (quadrature-phased components) when the monitor is used for observation of the output of the vertical camera unit.

Thus, the monitor is arranged to receive the video output of a selected camera unit, and to be controlled in its electrostatic deflection circuits by the same sweep voltage waves employed in the deflection circuits of the selected camera unit, so that it reproduces the picture image focused on the mosaic of the iconoscope thereof.

Figure 9:
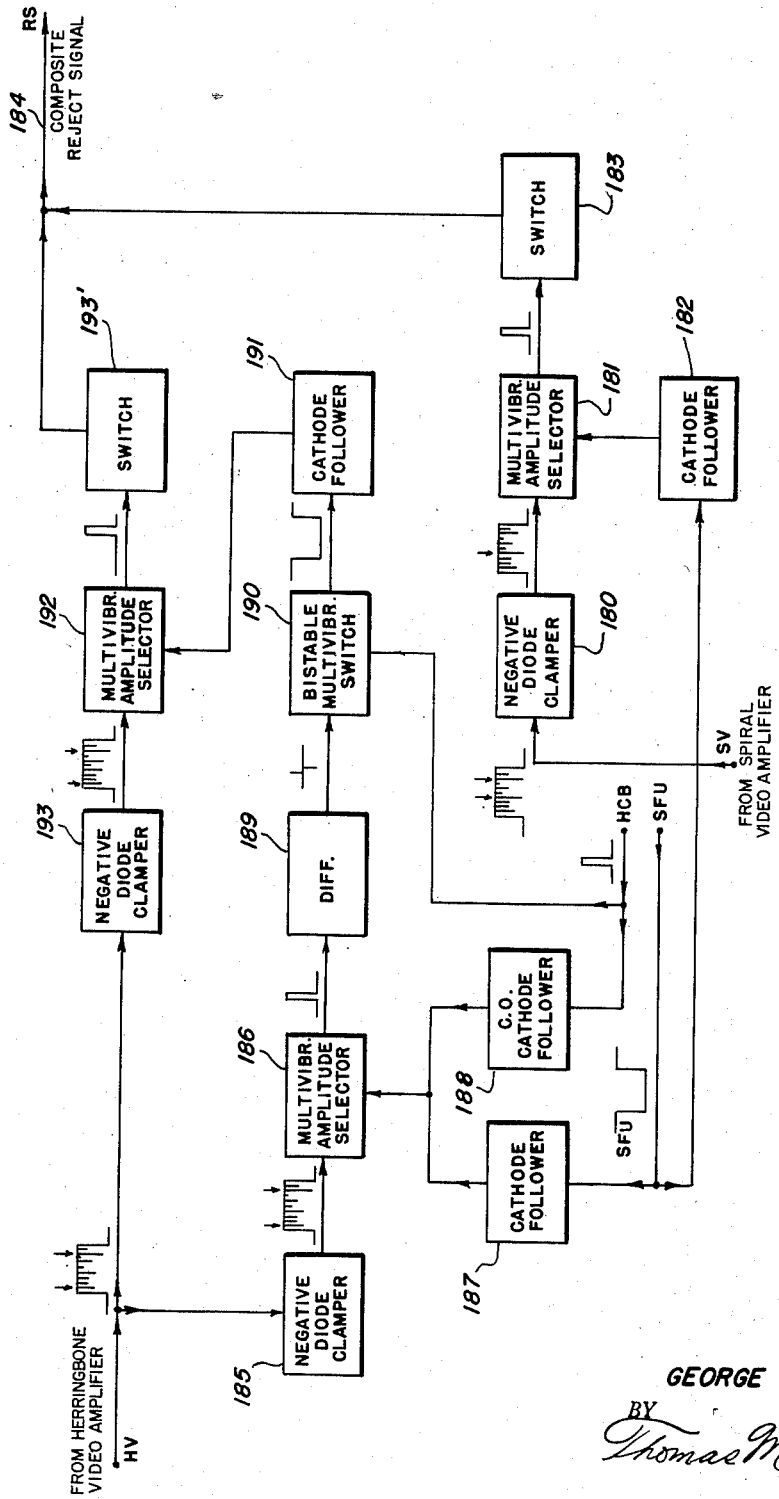
Fig. 9 is a schematic diagram of the discriminator system.

Fig. 9 illustrated the composition of the discriminator section of the electronic inspection and sorting system. This section includes a first major portion for receiving the amplified video signals due to the vertical view camera unit, and a second major portion for receiving the amplified video signals due to one horizontal view camera unit. A third major portion identical to the second may be provided where two camera units are set up for viewing the bottle or other object to be inspected along transverse horizontal directions.

A negative clamper stage 180 receives the output SV from the spiral video amplifier and clamps it to the black level established during blanking. The output of stage 180 is supplied to an input circuit of a multivibrator amplitude selector 181 which has its other input circuit controlled through a cathode follower 182 according to the single frame unblanking signal SFU. If, during the single-frame time interval of the unblanking pulse, the video signal strength momentarily exceeds the pre-set intensity for which unit 181 is adjusted, this unit responds with an output signal which brings about the operation of the solenoid rejector through amplifier stage 183.

The multivibrator amplitude selector 181 responds to a video voltage excursion representing a "black" signal greater than a predetermined threshold value, occurring during the single frame as timed by the single frame unblanking apparatus. As the beam of the iconoscope is swept through its spiral path from the middle region of the bottle bottom image toward the border thereof, the average intensity of the video voltage remains substantially unchanged until the border of the bottom image is reached. Even then, there is no abrupt change because the progress of the scanning beam impingement spot on the iconoscope mosaic into the dark ring of the image corresponding to the side wall of the bottle is substantially tangential, and hence quite gradual. This is particularly true when the origin point of the sweep is at the precise center of the image of the bottom disc of the bottle, and the border thereof is a perfect circle. Even where there is slight departure from these ideal conditions, the video voltage tends to show only gradual variation in the instance of a clean bottle, because the beam impingement spot requires an appreciable part of a cycle of the 3.84 kilocycle voltage (an appreciable part of one substantially circular path) to pass from the strongly lighted image region to the weakly lighted region, and a similar appreciable part of one circular path to pass back into the strongly lighted image region. The amplitude selector stage 181 does not respond with a rejection signal to these extensive changes of video voltage occurring gradually, and hence its response is reserved for the sharp discontinuities occurring with the abrupt passage of the scanning beam impingement spot into a dark area of the image—large or small—due to foreign matter on the bottom of the bottle.

If desired, band rejection filters tuned to 3.84 kc. and 7.68 kc. may be inserted between the video signal input terminals and the input circuit of the clamper 180, for providing substantial suppression of the first- and second-harmonic cyclical voltage variations occurring as the spot makes orbital transitions into the image border and again into the bright image portion corresponding to the bottom area of the bottle.

The discriminator circuit apparatus for working with the output of a horizontal camera unit (one utilizing the afore-described herringbone sweep) is required to accomplish functions similar to those of the vertical camera output discriminator apparatus 180—184, and in addition, to be effectively oblivious to the video signal voltage discontinuity occurring with each line scan traversal of the herringbone sweep through the image border as it proceeds toward the vertical center-line of the bottle image. Two multivibrator amplitude selectors are used in this discriminator system—the first for detecting the first strong "black" signal with each line scan passing through the border of the bottle image, and delaying the commencement of the period of responsiveness of the second (main) amplitude selector until a very short time thereafter.

The video input signal from a horizontal camera unit is clamped at the black level established during blanking by clamper stage 185. The amplitude selector 186 is turned on for the SFU gate through cathode follower 187 and is turned off during horizontal sweep retraces by normally cut-off-biased cathode follower 188, actuated by composite blanking signal HCB. Unit 186 produces an output pulse for each line sweep through the bottle image border, the leading edge of the pulse occurring at the commencement of the "black" video signal resulting with the traversal of the dark border, and the trailing edge of the pulse being delayed sufficiently to make sure that the camera scanning spot has completed its passage through the dark border into the principal area of the image.

This output pulse from unit 186 is differentiated in unit 189 and supplied to one input circuit of a bistable multivibrator switch 190, the other input circuit of which is operated under control of the herringbone composite blanking signal HCB. Switch circuit 190 supplies a repetitive rectangular output timing wave commencing at the end of each pulse from unit 186 (i. e., commencing at the timing of the negative spike in the output of differentiator 189). This recurrent rectangular wave is amplified in a cathode follower 191 and supplied to the time limit control input circuit of multivibrator amplitude selector 192. The other input circuit of unit 192 is supplied with a version of video signal HV clamped in a negative diode clamper 193.

Multivibrator amplitude selector 192 provides an output pulse only if the "black" intensity of the video signal exceeds a predetermined threshold voltage during the time limits of the successive rectangular waves supplied through units 190, 191, such an output pulse bringing about the operation of the solenoid rejector unit through amplifier stage 193'.

It will be apparent from the employment of the single frame unblanking signals through cathode follower 187 that the series of rectangular waves from units 190, 191 for enabling the selector stage 192 to be responsive to dark spots in the image are limited to the duration of the single frame unblanking wave, and hence any solenoid rejector action brought about through this discriminator system, like that due to system 180, 181, 182, 183, is confined to the complete image scan which first occurs after each brilliant momentary illumination of the bottle.

Where two transversely aimed horizontal camera units are used, as afore-described, units 185—193 are duplicated for a discriminator circuit arrangement responsive to the second horizontal camera unit.

Figs. 10 to 20, inclusive, illustrate circuits applicable to the foregoing diagram units.

Figure 10:
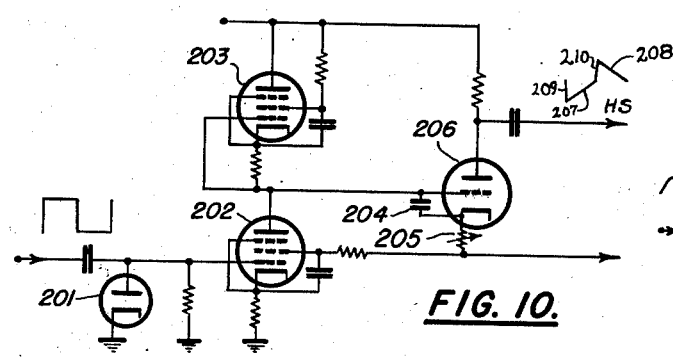
Figs. 10–20 are a series of circuit diagrams illustrating circuits suitable for use in the sections indicated by the corresponding labelled "blocks" of the diagrams in Figs. 6, 7, 8 and 9.

A schematic diagram of the herringbone sweep generator 86 (Fig. 6B) is given in Fig. 10. Tubes 202 and 203 are constant-current pentodes connected in series between ground and the positive 250-volt supply. Control grid and screen grid biases are chosen so that both pentodes operate on the flat portions of their plate current vs. plate voltage characteristics, but with tube 202 operating at a total cathode current double that of tube 203. Capacitor 204 and resistor 205, in series, are connected between the junction of the anode of tube 202 and the cathode of tube 203, and a supply of 125 volts positive potential with respect to ground. When tube 202 is cut off, capacitor 204 charges towards 250 volts with a constant charging current I, the cathode current of tube 203. When tube 202 is conducting, capacitor 204 discharges towards ground with the same value of constant current I, half the current of tube 202, the other half of the cathode current of tube 202 being the cathode current of tube 203. Therefore, with the cut-off periods and the conduction periods of tube 202 of equal length, the voltage across capacitor 204 is a symmetrical, linear triangular wave.

When resistor 205 is adjusted to the extreme with zero resistance inserted in the capacitor circuit, the output at the anode of tube 206 is a triangular wave similar to the current wave of capacitor 204, but inverted with respect thereto. When the variable resistor 205 is adjusted to a setting for inserting a finite resistance value, the square wave of the voltage drop across it due to the alternate prevalence of the constant current in the first direction and the equal constant current in the opposite direction, with the abrupt reversals of current direction therebetween, raises and lowers the potential of tube 206 to add "jumps" to the triangular wave at its plate.

In this composite waveform, designated HS, the lines of opposite slope are the two halves of the line sweep 207 and 208, and the substantially vertical jumps, which occur just prior to the starts of each half and are in the opposite directions thereto, are the two re-traces 209 and 210. The positive clamping diode 201 keeps the input coupling capacitor from biasing the control grid of tube 202 positive during conduction. In actual operation, the average voltages developed across capacitor 205 and the screen grid capacitors adjust themselves so that the grid of tube 206 is never driven positive and the waveform is very symmetrical.

Over a considerable range of resistance value adjustments of resistor 205 the peak-to-peak amplitude of the output remains constant while the amount of jump is varied. This permits the meeting-line of the rightward and leftward sweeps to be adjusted—i. e., adjustment for the lines to reach just the same common midline, without a gap and without overlap—while the left- and right-hand margins of the horizontal sweep raster remain fixed.

Figure 11:
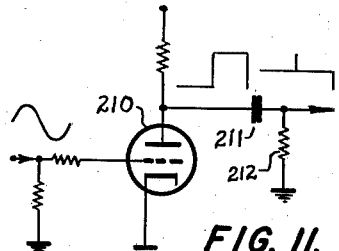

Fig. 11 illustrates a typical squaring circuit and differentiator combination, a triode tube 210 being employed with a series grid resistor for sharply squaring the tops of the high-amplitude input waves as the grid reaches the cathode potential in the positive-going wave portion, and hence squaring the lower output wave portions. The input wave amplitude being quite high, the grid of the tube is negative beyond cut-off potential during the greater part of the negative half-wave, and the positive part of the anode output wave is thus also sharply limited. The substantially square wave resulting from the sharp limiting in the positive and negative senses is supplied to a differentiating circuit comprising series capacitance 211 and shunt resistance 212, for producing alternate positive and negative spikes spaced at substantially one-half cycle intervals. This circuit arrangement is illustrative of units 61 and 62 of Fig. 6A, and likewise of units 65 and 66 thereof. Further squaring and differentiating combinations are shown at 77, 78 and 80, 81 (Fig. 6C). The R—C differentiator circuit portion 211, 212 is likewise typical of further elements of the system, e. g. units 101, 104 and 108 of Fig. 7, and unit 189, Fig. 9.

Figure 12:
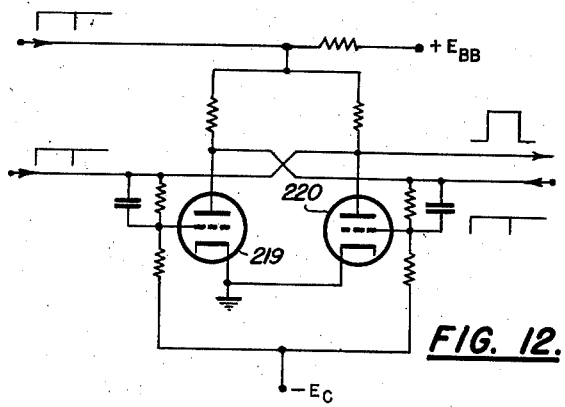

A typical bistable multivibrator comprising a pair of tubes 219, 220 (or tube units of a dual-triode) is shown in Fig. 12. The grid and anode circuits of these tubes are cross-coupled, as shown. For operation as an Eccles-Jordan switch circuit, as in unit 63, Fig. 6A, one input circuit connection is made to one tube anode, and the other input connection is made to the other anode. For operation of this unit as a frequency divider, as for unit 68, Fig. 6A, the input pulses are supplied to a common resistor in the circuits of the two anodes.

Figure 13:
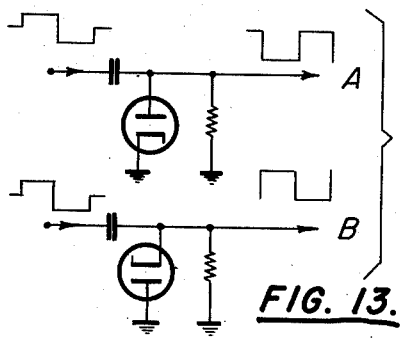
Figure 14:
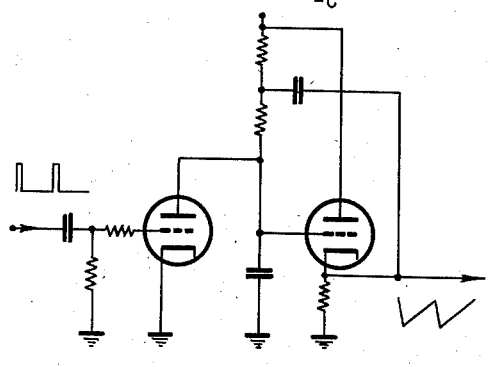

Positive and negative diode clamper circuits are illustrated at A and B in Fig. 13, and a recurrent-pulse-controlled sawtooth wave generator is illustrated in Figure 14. These are well-known circuits, and like the foregoing circuits of Figs. 11 and 12, are well known in the art. An excellent reference text on these and several other circuits involved herein is volume No. 19 of the M. I. T. Radiation Laboratory Series, McGraw-Hill Book Co., 1949, the volume entitled "Waveforms."

Figure 15:
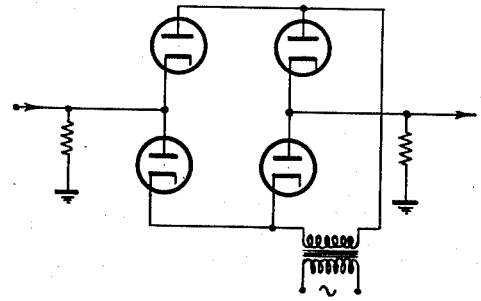
Figure 16:
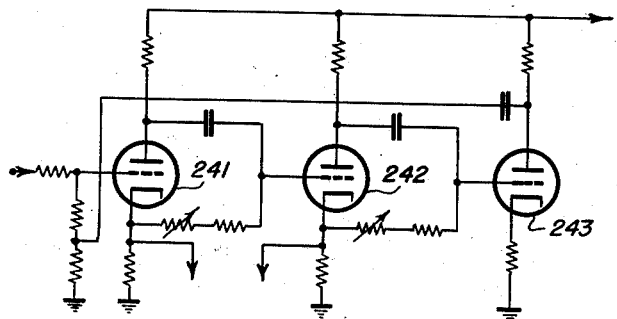

A carrier-balanced diode-switch modulator is illustrated in Fig. 15. Fig. 16 shows a selective amplifier system with quadrature-phase outputs, suitable for use at 94 in Fig. 6C, each of tubes 241 and 242 being provided with a 90 degree phase-shift capacitor-resistor output circuit. The feedback amplifier tube 243 provides 180 degree phase inversion, and feeds its output back to the grid of the first tube 241, so that the phase relations are for regeneration at 3.48 kilocycles and for degeneration at frequencies appreciably displaced therefrom.

Figure 17:
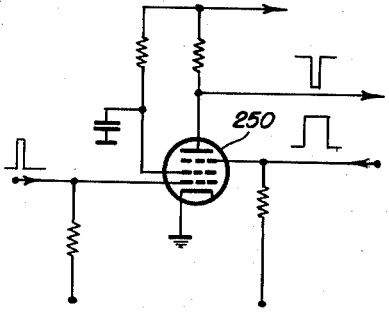

A pentode coincidence switch circuit is shown in Fig. 17, with a pentode tube 250 arranged to receive input signals in its control grid circuit and in its suppressor grid circuit, and to provide an anode output pulse timed according to the coincidence of the positive input signals.

Figure 18:
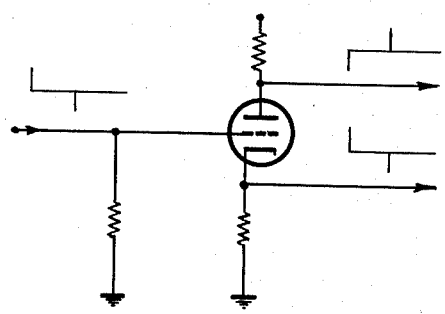

A typical phase-splitter, with equal anode and cathode output load resistors for its respective output circuits, is shown in Figure 18.

Figure 19:
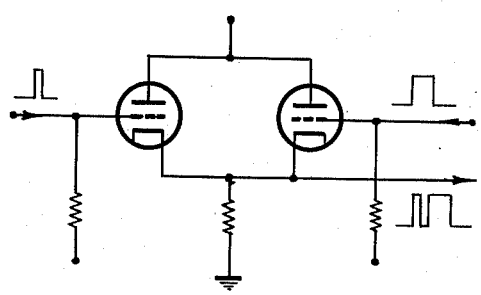

Fig. 19 shows a cut-off cathode follower mixer, typical of the circuits at 121, 122 and 123, 124 in Fig. 7. This circuit provides a cathode output wave wherein positive pulses supplied to the grid of the first triode and positive pulses supplied to the grid of the second triode are all reproduced.

Figure 20:
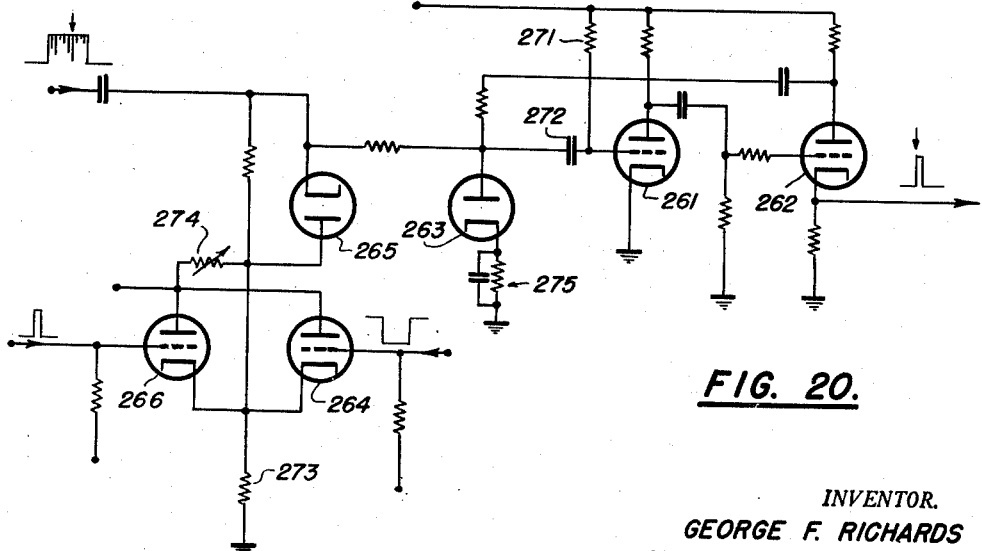

Fig. 20 illustrates a multivibrator amplitude selector, typical of units 181, 186 and 192 of Fig. 9. Tubes 261 and 262 and their associated capacitors and resistors constitute a circuit configuration similar to an astable or "free-running" multivibrator except that diode 263 shunts one of the feedback paths to ground when it is conducting. In this quiescent state, tube 261 is heavily conducting and tube 262 is lightly conducting. When diode 263 is made non-conducting, the shunt on the feedback path is removed and, by regeneration, tube 261 quickly becomes non-conducting and tube 262 heavily conducting. All other time constants being relatively long, the circuit remains in this state for a period of time determined by resistor 271 and capacitor 272.

Normally, tube 263 is held conducting principally by the voltage drop across resistor 273; due to the cathode current of tube 264 plus the current through resistor 274 to positive 250 volts; and incidentally by the white video input signals which are clamped to the potential of the upper end of resistor 273 by diode 265 at the black level established during blanking. However, during the period of the SFU gate, tube 264 is cut off and the voltage across resistor 273 is determined only by resistor 274. If this resistor is so adjusted that the voltage at this time is equal to the voltage across resistor 275, then tube 263 is conducting only because of the white video signals present during the SFU gate. If any video signals reach the black level, tube 263 will be cut off and the multivibrator will regenerate and produce an output pulse at the cathode of tube 262. Resistor 274, therefore, determines the video black signal intensity threshold at which the circuit will operate during the first frame scanned after the flash lamp has been extinguished. This spiral rejection signal has been designated SR. Tube 266 is used only in the herringbone amplitude selector circuit, for preventing response to the video signal excursion occurring as the beam impingement spot passes through the image border toward the image interior area—no counterpart of this tube is required in connection with the video output of the spiral scan system, since it has no such image entry video excursion.

In the system described above, the camera tubes and the monitor cathode ray tube have been illustrated as provided with electrostatic scanning arrangements. It should be understood, however, that other scanning arrangements, as with electromagnetic scan features for one or both axes, may be used. Also, the television camera tubes may be of any of a variety of forms, of which the image iconoscope and the Vidicon are two examples.

The uses to which the present invention may be put are not limited to detection of foreign matter or other faults in bottles. It may be used for inspection of the exterior of solid or filled objects, or for selection and/or rejection of objects which are dimensionally or otherwise out of conformity with predetermined standards. Dimensional disconformity, for example, may be checked by employment of ordinary saw-tooth horizontal scan in the transverse-view camera units instead of herringbone scan, and providing blanking for the video excursions corresponding to the passage of the scanning beam impingement spot outward through the image border, said blanking being timed by a predetermined delay after the entrance border blanking and to a predetermined duration according to the desired tolerances of the objects to be accepted.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Electronic inspection apparatus comprising a television camera tube, a focussing system for presenting on the image screen or mosaic thereof a focussed image of an object at a predetermined position, means for passing a series of objects through said position, means for providing intense momentary illumination of each of said objects as it reaches said position, means including a video amplifier responsive to the output of said camera tube for detecting unusual variations in the output thereof, and means for timing the responsiveness of said last-named means according to the timing of said illumination providing means, said responsiveness timing means comprising means for normally blocking the output of said video amplifier and for rendering said amplifier operative for a predetermined period after each momentary object illumination.

2. Electronic inspection apparatus as defined in claim 1, wherein said means for providing intense momentary illumination comprises a high-intensity gas discharge lamp, means including an output capacitor for regularly providing an appreciable electric charge across said lamp, and means responsive to the arrival of each object at said position for triggering the ignition of said lamp to discharge said capacitor therethrough.

3. Electronic inspection apparatus as defined in claim 1, wherein said responsiveness timing means includes means for normally extinguishing the electron beam of said television camera tube, and means for rendering the electron beam operative simultaneously with the operative condition of said video amplifier.

4. Electronic inspection apparatus comprising means for moving a series of similar objects continuously along a predetermined path, means responsive to arrival of each object at a predetermined position along said path for brilliantly flash-illuminating the object, light-responsive means including a photosensitive screen and means for focussing thereon an image of a flash-illuminated object and cyclical raster scanning means for said screen, said light-responsive means having appreciable retentivity, means responsive to each flash of said illuminating means for initiating raster scanning of said screen at the commencement of the first complete scan raster cycle after the flash, said means for scanning said screen comprising means for directing an electron beam toward said screen and means for scanning said beam throughout a predetermined screen scan pattern after each flash, and means for indicating a sharp discontinuity in video voltage output of said light-responsive means.

5. Electronic inspection apparatus as defined in claim 4 wherein said beam scanning means comprises means including at least one recurrent sweep voltage generator for scanning said beam through said pattern in a period of a lesser order of magnitude than the intervals of arrival of said objects at said predetermined position, thereby producing video voltage output variations according to variations of extent to which elemental areas of said screen were illuminated, and thereby also erasing the effect of the image illumination of said screen, and means for retaining said screen scanning means extinguished throughout said flash and until the commencement of a complete scan thereafter.

6. Electronic inspection apparatus as defined in claim 5, wherein said means for indicating a sharp discontinuity is blocked out throughout all the time except the first complete scan cycle following each flash.

7. Electronic inspection apparatus for bottles and like objects, comprising means for fully illuminating each bottle or object when it is at a predetermined position, at least two television camera units directed at said predetermined position in first and second mutually transverse bottle or object viewing directions, each of said television camera units including an image tube and means for focussing an image thereon and comprising means for scanning said image tube and producing video output signals, and means coupled to both said camera units and responsive to a video output voltage excursion exceeding predetermined limits, from either camera unit, for indicating a faulty bottle or object.

8. Electronic inspection apparatus as defined in claim 7, further including means for passing said bottles or like objects along a path through said predetermined position, said means for illuminating each bottle or object at said predetermined position including means responsive to arrival of each bottle or object at said position for providing instantaneous flash illumination thereof.

9. Electronic inspection apparatus as defined in claim 7, further including a third television camera unit for receiving an image of said object along a third viewpoint direction transverse said first and second viewing directions, and utilization means responsive to a video voltage excursion exceeding predetermined limits from any of said three television camera units.

10. Electronic inspection apparatus for bottles, comprising means for illuminating each bottle when it is at a predetermined position, at least two television camera units directed at said bottle in said position, each of said television camera units including an image tube and means for focussing an image thereon and comprising means for scanning said image tube and producing video output signals, one of said camera units being directed axially into the bottle and the other of said two camera units being directed at said bottle along a viewpoint direction transverse said axis, and means coupled to both said camera units and responsive to a video voltage excursion exceeding predetermined limits, from either camera unit, for indicating a faulty bottle.

11. Electronic inspection apparatus as defined in claim 10, further including a third television camera unit directed at said bottle in said position along a viewpoint direction transverse the viewpoint directions of said two television camera units, said means for indicating a faulty bottle being coupled to all of said television camera units.

12. Electronic inspection apparatus as defined in claim 11, wherein each of said television camera units includes first and second component sweep circuits, means being included for synchronizing the first component sweeps of all said television camera units and also synchronizing the second component sweeps of all said television camera units.

13. Electronic inspection apparatus as defined in claim 12, wherein said television camera unit directed axially into the bottle includes quadrature-phase deflection circuits and saw-tooth modulated quadrature phase excitation circuits therefor whereby spiral scanning is produced, and said transverse viewpoint direction television camera units include low-frequency and high-frequency sweep circuits for their respective first and second scan component directions, said low-frequency sweep circuits being synchronized with the saw-tooth modulation of said quadrature-phase deflection circuits, and said high-frequency sweep circuits being synchronized with the high-frequency carrier components in said saw-tooth modulated quadrature-phase deflection circuits.

14. Electronic inspection apparatus as defined in claim 13, wherein said high-frequency sweep circuits for the second scan component directions of said transverse viewpoint direction television camera units comprise means for scanning alternately in one direction across substantially one-half the scan areas of said units and in the opposite direction across substantially the complementary half of the scan areas thereof.

15. Electronic inspection apparatus for objects, comprising: means for moving a plurality of objects in a series through a predetermined position, means for illuminating each object when it is at said predetermined position; a television camera unit directed toward said position for receiving on its mosaic an image of the object at said predetermined position, said television camera unit including a scanning beam producing means and first and second mutually transverse component direction beam deflection circuits, means coupled to said first deflection circuit for gradually and substantially linearly increasing the displacement of the beam from a base line of the scan raster at a low recurrence frequency, and means coupled to said second deflection circuit for alternately sweeping said beam in a first direction across substantially one-half the area of said scan raster and in the opposite direction across the complementary area of substantially one-half said scan raster area, at a frequency appreciably higher than said low recurrence frequency; and means responsive to excursions of the video output voltage of said television camera unit for denoting faulty objects.

16. Electronic inspection apparatus as defined in claim 15, further including means for rendering said last-named means unresponsive to the excursions occurring upon traversal of the border of the object image area of said raster at the normal position thereof.

17. Electronic inspection apparatus as defined in claim 15, wherein said means for illuminating each object when it is at said predetermined position comprises a flash illuminator, and means responsive to the arrival of an object at said predetermined position for momentarily energizing said flash illuminator.

18. Electronic inspection apparatus for bottles, comprising means for passing the bottles in a series continuously through a predetermined position, means responsive to the arrival of each bottle at said position for providing flash-illumination of each bottle at the moment of passage thereof through said position, at least two television camera units directed in mutually transverse directions toward said position for viewing each bottle from diverse viewpoints, and means coupled to the outputs of said camera units and responsive to a video output excursion exceeding predetermined limits, from either camera unit, for indicating a faulty bottle.

19. Electronic inspection apparatus as defined in claim 18, wherein two of said television camera units are directed transverse to the axis of said bottle in said position and transverse the direction of each other.

20. Electronic inspection apparatus as defined in claim 18, wherein one of said television camera units is directed axially into the bottle in said predetermined position, and another one of said television camera units is directed transverse the axis of the bottle in said position.

21. Electronic inspection apparatus for bottles and the like, comprising a television camera unit directed for axial viewing of each bottle or like object as it occupies a predetermined position, said camera unit including an image tube with scanning means for first and second mutually transverse axes and means for focussing an image on said image tube and comprising means for producing video output signals during the scanning of said image tube, means for supplying to said first and second transverse axes scanning means first and second alternating electric signals of quadrature mutual phase relation to produce scan rotation, means included in said last-defined means for modulating said electric signals to cause the scan to proceed through a spiral pattern, and means selectively responsive to rapid changes of video output voltage for detecting faults in the inspected bottles or the like.

22. Electronic inspection apparatus as defined in claim 21, further including means for flash-illuminating each bottle or like object upon the arrival thereof at said predetermined position, and mean synchronized with said flash-illuminating means for withholding the commencement of scanning of the image tube until after the completion of said flash-illumination.

23. Electronic inspection apparatus as defined in claim 21, further including means for passing bottles or objects continuously through said predetermined position, and means responsive to the movement of said bottles or objects into said position for flash-illuminating each bottle or object momentarily in said predetermined position.

24. Electronic inspection apparatus as defined in claim 4, wherein said means responsive to arrival of each object at a predetermined position along said path for brilliantly flash-illuminating the object comprises a light beam source and a light-responsive element arranged to cooperate therewith, said source providing a beam of light directed toward the path of said objects to impinge on each object in turn, and means coupled to said light-responsive element and responsive to the change of light resulting from arrival of each object for timing the flash illuminations of the objects.

References Cited in the file of this patent

UNITED STATES PATENTS

| | | |
|---|---|---|
| 1,294,740 | Winkley | Feb. 18, 1919 |
| 2,137,187 | Stoate | Nov. 15, 1938 |
| 2,194,808 | Pooley | Mar. 26, 1940 |
| 2,247,684 | Hickok | July 1, 1941 |
| 2,254,435 | Loughren | Sept. 2, 1941 |
| 2,294,809 | Smith | Sept. 1, 1942 |
| 2,315,287 | Halloway | Mar. 30, 1943 |
| 2,483,149 | Norgaard | Sept. 27, 1949 |
| 2,561,197 | Goldsmith | July 17, 1951 |
| 2,648,723 | Goldsmith | Aug. 11, 1953 |
| 2,649,500 | Fedorchak | Aug. 18, 1953 |

OTHER REFERENCES

Goldsmith: Abstract of application Serial No. 68,116, published July 8, 1952, O. G. 660.

Goldsmith: Abstract of application Serial No. 68,117, published July 8, 1952, O. G. 660.

"Scientific American" magazine, issue of March 1928, page 255.